(12) United States Patent
Morgenstern et al.

(10) Patent No.: US 8,974,099 B2
(45) Date of Patent: Mar. 10, 2015

(54) VEHICLE HEADLIGHT

(75) Inventors: Sebastian Morgenstern, Munich (DE); Stefan Danner, Unterschleissheim (DE); Christopher Weil, Munich (DE); Helmut Erdl, Flintsbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 25 days.

(21) Appl. No.: 13/418,855

(22) Filed: Mar. 13, 2012

(65) Prior Publication Data

US 2012/0170299 A1    Jul. 5, 2012

Related U.S. Application Data

(63) Continuation of application No. PCT/EP2010/003975, filed on Jul. 1, 2010.

(30) Foreign Application Priority Data

Sep. 14, 2009 (DE) .......................... 10 2009 041 189

(51) Int. Cl.
| | |
|---|---|
| *F21V 1/00* | (2006.01) |
| *B60Q 1/14* | (2006.01) |
| *F21S 8/10* | (2006.01) |

(52) U.S. Cl.
CPC .......... *B60Q 1/1415* (2013.01); *F21S 48/1154* (2013.01); *F21S 48/1747* (2013.01); *B60Q 2400/30* (2013.01)
USPC ........... 362/509; 362/235; 362/507; 362/538; 362/543; 362/545

(58) Field of Classification Search
USPC ......... 362/234, 235, 243, 487, 507–509, 523, 362/538, 543–545
See application file for complete search history.

(56) References Cited

U.S. PATENT DOCUMENTS

| | | |
|---|---|---|
| 2002/0067618 A1 | 6/2002 | Woerner et al. |
| 2004/0125614 A1 | 7/2004 | Ishida et al. |
| 2004/0170028 A1 | 9/2004 | Schug et al. |
| 2006/0002129 A1 | 1/2006 | Pauty et al. |

(Continued)

FOREIGN PATENT DOCUMENTS

| | | |
|---|---|---|
| DE | 198 60 461 A1 | 7/2000 |
| DE | 101 31 444 A1 | 1/2003 |

(Continued)

OTHER PUBLICATIONS

International Preliminary Report on Patentability dated Mar. 29, 2012 (nine (9) pages).

(Continued)

*Primary Examiner* — Anh Mai
*Assistant Examiner* — Meghan Dunwiddie
(74) *Attorney, Agent, or Firm* — Crowell & Moring LLP

(57) ABSTRACT

A vehicle headlight having a plurality of semiconductor emitters for the alternative production of a low-beam light distribution and a daytime driving light distribution is provided. For producing the low-beam light distribution, a low-beam light luminous surface is generated by the vehicle headlight. For producing the daytime driving light distribution, a daytime driving light luminous surface is generated by the vehicle headlight. The low-beam light luminous surface and the daytime driving light luminous surface are essentially identical.

20 Claims, 3 Drawing Sheets

(56) References Cited

U.S. PATENT DOCUMENTS

| | | |
|---|---|---|
| 2008/0062712 A1 | 3/2008 | Woodward |
| 2008/0239746 A1 | 10/2008 | Wuller et al. |
| 2009/0129083 A1 | 5/2009 | An |

FOREIGN PATENT DOCUMENTS

| | | | |
|---|---|---|---|
| DE | 102 05 779 A1 | 10/2003 | |
| DE | 10 2005 041 234 A1 | 3/2007 | |
| DE | 60 2005 000 773 T2 | 1/2008 | |
| DE | 20 2007 015 533 U1 | 2/2008 | |
| DE | 10 2006 046 168 A1 | 4/2008 | |
| EP | 2 058 585 A2 | 5/2009 | |
| WO | WO 2006/034329 A2 | 3/2006 | |

OTHER PUBLICATIONS

International Search Report dated Sep. 23, 2010 with English translation (six (6) pages).

German Search Report dated Mar. 30, 2010 with partial English translation (nine (9) pages).

VEHICLE HEADLIGHT

CROSS-REFERENCE TO RELATED APPLICATIONS

This application is a continuation of PCT International Application No. PCT/EP2010/003975, filed Jul. 1, 2010, which claims priority under 35 U.S.C. §119 from German Patent Application No. DE 10 2009 041 189.5, filed Sep. 14, 2009, the entire disclosures of which are herein expressly incorporated by reference.

BACKGROUND AND SUMMARY OF THE INVENTION

The invention relates to a vehicle headlight.

Related art vehicle headlights are capable of implementing a low-beam light luminous surface for producing a low-beam light distribution and, independently thereof, implementing a daytime running light luminous surface that differs from the low-beam light luminous surface, for producing a daytime running light luminous surface.

It is an increasingly significant goal of light developers to create motor vehicle lights, particularly vehicle headlights, that have a very distinctive design and may provide brand recognition value. In the past, this was attempted especially by particularly distinctive implementations of the daytime running light luminous surfaces. Thus, particularly distinctive related art daytime running lights may have the form of rings, double rings, or oscillators. However, the distinctive design that can be achieved by such distinctive daytime running light luminous surfaces for headlights for the vehicle, or even the vehicle brand, is reduced by the fact that, in darkness, the same headlight gives a completely different appearance based on a low-beam light luminous surface, even if the low-beam light luminous surface comprises the day time running light luminous surface.

In addition, related art headlights may use light-emitting diodes for implementing the low-beam light. It is currently assumed that this development will intensify in the next few years because of increasingly more efficient light-emitting diodes.

It is now an object of the invention to specify a vehicle headlight having a highly distinctive design.

This object may be achieved by a vehicle headlight that includes a plurality of semiconductor emitters, particularly light-emitting diodes or groups of light-emitting diodes, for alternatively producing a low-beam light distribution and a daytime driving light distribution. For producing the low-beam light distribution, a low-beam light luminous surface is generated by the vehicle headlight. For producing the daytime driving light distribution, a daytime driving light luminous surface is generated by the vehicle headlight. The low-beam light luminous surface and the daytime driving light luminous surface are identical.

Embodiments of the invention are therefore based on the idea of enhancing the distinctive design of a vehicle headlight in that, relative to the luminous surface, an essentially identical appearance is provided by the vehicle headlight at night and during the day.

For this purpose, a vehicle headlight according to embodiments of the invention comprises a plurality of semiconductor emitters, particularly light-emitting diodes or groups of light-emitting diodes, especially for the alternative producing of a low-beam light distribution and a daytime driving light distribution, depending on whether the headlight is switched to low-beam light or daytime driving light.

Semiconductor emitters may be provided which either contribute only to the low-beam light distribution or only to the daytime running light distribution; thus, are active only when the headlight is switched to low-beam light or only when the headlight is switched to daytime running light; or which, when the headlight is switched to low-beam light distribution, contribute to the low-beam distribution and when the headlight is switched to daytime running light distribution, contribute to the daytime running light distribution.

For producing the low-beam light distribution, the vehicle headlight generates a low-beam light luminous surface. For example, the low-beam light distribution produced by the vehicle headlight can be perceived in the form of a low-beam light luminous surface particularly by an observer standing in front of the headlight.

For producing the daytime driving light distribution, the vehicle headlight generates a daytime driving luminous surface. For example, the daytime driving light distribution produced by the vehicle headlight can be perceived in the form of a daytime driving light luminous surface particularly by an observer standing in front of the headlight.

The vehicle headlight is now constructed such that the low-beam light luminous surface and the daytime driving light luminous surface are essentially identical. In particular, the low-beam light luminous surface and the daytime driving light luminous surface share a common luminous surface. In particular, the low-beam light luminous surface and the daytime driving light luminous surface are physically identical. In this case, the low-beam light luminous surface and/or the daytime driving light luminous surface may consist of one or more parts.

As a rule, the total low-beam light distribution and/or the total daytime driving light distribution is produced by additionally taking into account the light emitted by a second vehicle headlight. When, within the scope of the invention, reference is made to a light distribution, a low-beam light distribution or a daytime driving light distribution, this is, as a rule, the part of the total low-beam light distribution or total daytime driving light distribution that is based on the concerned vehicle headlight or headlight module, particularly according to embodiments of the invention.

The total low-beam light luminous surface and/or the total daytime driving light luminous surface can be formed by several luminous surfaces which can each be assigned to one of several headlight modules of one of several headlights.

The wording "the low-beam light luminous surface and the daytime driving light luminous surface are essentially identical" preferably means that at least 60% or at least 70% or at least 80% or at least 90% or at least 95% of the daytime driving light luminous surface corresponds to the low-beam light luminous surface and/or that at least 60% or at least 70% or at least 80% or at least 90% or at least 95% of the low-beam light luminous surface corresponds to the daytime driving light luminous surface.

As an alternative or in addition to the above, the wording "the low-beam light luminous surface and the daytime driving light luminous surface are essentially identical" means that the daytime driving light luminous surface covers at least 60% or at least 70% or at least 80% or at least 90% or at least 95% of the low-beam light luminous surface and/or that the low-beam light luminous surface covers at least 60% or at least 70% or at least 80% or at least 90% or at least 95% of the daytime driving light luminous surface.

A luminous surface preferably is that part of an optical device disposed in front of the semiconductor emitters, such as a front lens system, a lens, an intermediate light lens, a diffusing lens or a safety lens, which can be perceived as a luminous surface by an observer standing in front of the vehicle headlight especially in the driving direction, or which determines the perceivable luminous geometry. In this case and in the following further developments, the diffusing lens or safety lens may also comprise a Fresnel lens system.

As an alternative or in addition, a luminous surface can be determined in the sense of a light exit surface or a light passage surface as that part of an optical device disposed in front of the semiconductor emitters, such as a front lens system, a lens, an intermediate light lens, a diffusing lens or a safety lens, through which at least 70%, at least 80% or at least 90% or at least 95% of the light emitted by the concerned headlight or headlight module passes for producing the corresponding light distribution.

According to embodiments of the invention, a headlight is created which, in the case of low-beam light and daytime driving light, at least partly provides an essentially identical appearance. This leads to a more distinctive design and may produce brand recognition value.

The semiconductor emitters are preferably divided into a first headlight module and a second headlight module, which each contribute to the low-beam light distribution and/or the daytime driving light distribution. In addition, there may also be a further vehicle headlight according to embodiments of the invention, which also contributes to the total low-beam light distribution and/or the total daytime driving light distribution.

Particularly for an observer standing in front of the headlight, the low-beam light distribution in the form of a low-beam light luminous surface of the first and/or second headlight module will then preferably be perceivable, and/or the daytime driving light distribution in the form of a daytime driving light luminous surface of the first and/or second headlight module will then preferably be perceivable. For producing the daytime driving light distribution and/or the low-beam light distribution, preferably a daytime driving light luminous surface and/or a low-beam light luminous surface respectively is generated by a or the headlight module(s).

According to a preferred embodiment, the low-beam light luminous surface and/or the daytime driving light luminous surface of the two headlight modules are essentially identical with respect to their design, geometry or contour.

As a result, design-related degrees of freedom are created in order to further augment the distinctiveness of the design.

It is a further development of the invention that semiconductor emitters are jointly utilized or identical semiconductor emitters are used for producing the low-beam light distribution and the daytime driving light distribution. At least one semiconductor emitter is used here for producing the low-beam light distribution as well as the daytime driving light distribution.

As a result, costs for components, weight and space can be reduced.

Embodiments of the invention will be particularly advantageous when the ratio of surface circumference to surface content relative to the low-beam light luminous surface and/or the daytime driving light luminous surface of a vehicle headlight or a headlight module is greater than relative to a rectangle circumscribing the low-beam light luminous surface and/or the daytime driving light luminous surface. As an example, the ratio of the surface circumference to the surface content relative to the low-beam light luminous surface and/or the daytime driving light luminous surface of a vehicle headlight or a headlight module may be 10% greater or 20% greater or 30% greater than the ratio of the surface circumference to the surface content relative to a rectangle circumscribing the low-beam light luminous surface and/or the daytime driving light luminous surface.

The reason is that, in comparison to related art round or rectangular luminous surfaces, such luminous surfaces are particularly distinctive and easy to remember. However, such surfaces can be reasonably implemented only based on a plurality of semiconductor emitters.

It is particularly preferably provided that the semiconductor emitters and optical elements or devices pertaining to these emitters and particularly disposed in front of the latter are constructed and arranged relative to one another such that the low-beam light luminous surface per se and/or the daytime driving luminous surface per se can be perceived particularly by an observer standing in front of the vehicle headlight with respect to the brightness by way of the corresponding luminous surface as essentially homogeneous.

This intensifies the distinctive design of the corresponding luminous surface geometry.

For this purpose, the semiconductor emitters and optical elements or devices pertaining to these emitters and particularly disposed in front of the latter are preferably constructed and arranged relative to one another such that the luminance distribution of the low-beam light luminous surface and/or of the daytime driving light luminous surface over the corresponding luminous surface is essentially constant.

An observed luminous surface is perceived as homogeneously luminous when the following applies to the maximal luminance (max_luminance) of the luminous surface and the smallest luminance (min_luminance) of the luminous surface:

$$\log(\mathrm{max\_luminance}) - \log(\mathrm{min\_luminance}) < |1|.$$

Within the scope of this preferred embodiment, in particular, the following should therefore apply to at least 80% or at least 90% of the daytime driving light luminous surface and/or the low-beam light luminous surface:

$$\log(\mathrm{max\_luminance}) - \log(\mathrm{min\_luminance}) < |1|.$$

The vehicle headlight preferably comprises a carrier device for the indirect or direct carrying of semiconductor emitters and/or of optical elements of the first and/or second headlight module. By using a swiveling device, the carrier device can be swiveled such that the light distribution produced by the first and/or second headlight module is moved vertically. By using a control device, the swiveling device is controlled such that, for producing the daytime driving light distribution, at least a part of the low-beam light distribution is swiveled upward and/or at least partly utilized. Thus, semiconductor emitters and/or optical elements are at least partly utilized for producing both light distributions. Particularly preferably, semiconductor emitters, which are utilized for producing the low-beam light distribution, are also used, particularly in a dimmed manner, for producing the daytime driving light distribution. As an alternative or in addition to the semiconductor emitters for producing the low-beam light distribution, further semiconductor emitters can be provided for producing the daytime driving light distribution.

Costs for components, weight and space can thereby be reduced.

A preferred vehicle headlight comprises at least one low-beam light semiconductor emitter for producing at least the low-beam light distribution and at least one daytime driving light semiconductor emitter for producing the daytime driving light distribution. In addition to these semiconductor emitters, naturally additional semiconductor emitters can contribute to the producing of the corresponding light distribution. The low-beam light semiconductor emitter, the daytime driving light semiconductor emitter, and at least one optical element assigned to and particularly disposed in front of the low-beam light semiconductor emitter and/or the daytime driving light semiconductor emitter are constructed and arranged relative to one another such that light originating from the low-beam light semiconductor emitter and light originating from the daytime driving light semiconductor emitter is imaged by the optical element (projected, directed in a bundled manner, etc.), particularly in order to generate the daytime driving light luminous surface and/or the low-beam light luminous surface.

Costs for components, weight and space can also be reduced by this double utilization of an optical element for generating the daytime driving light luminous surface and/or the low-beam light luminous surface.

It is particularly preferably provided that at least one lens is disposed in front of the low-beam light semiconductor emitter and/or the daytime driving light semiconductor emitter such that light originating from the low-beam light semiconductor emitter and light originating from the daytime driving light semiconductor emitter is imaged by the lens, the daytime driving light semiconductor emitter being placed lower than the low-beam light semiconductor emitter.

As a result of the lower placement of the daytime driving light semiconductor emitter relative to the low-beam light semiconductor emitter, it can be achieved in connection with a suitable lens that the light originating from the daytime driving semiconductor emitter causes a relatively high placing of the concentration of the resulting light distribution. This is advantageous for producing the daytime driving light distribution because the concentration of the daytime driving light distribution relative to the concentration of the low-beam light distribution is also in a high location.

In this context, it is also particularly preferably provided that light originating from the daytime driving light semiconductor emitter and/or from the low-beam light semiconductor emitter is guided by at least one optical waveguide to a corresponding daytime driving light output point and/or low-beam light output point. For the above-mentioned reason, the daytime driving light semiconductor emitter and/or the output point of the daytime driving light semiconductor emitter are then also placed lower than the low-beam light semiconductor emitter and/or the output point of the low-beam light semiconductor emitter.

By guiding the light to the correct point by an optical waveguide, it can be achieved, for example, without any corresponding placement of a daytime driving light semiconductor emitter itself that nevertheless a relatively small lens can be used for producing the daytime driving light distribution as well as the low-beam light distribution.

It is a further development of the invention that the first, particularly the exterior headlight module can be horizontally swiveled. A cornering light function can thereby be implemented by the vehicle headlight.

It is particularly preferably provided that a lower section, particularly the lowest 10% or 20% or 30%, of the low-beam light luminous surface of a headlight module or of the vehicle headlight is situated essentially more steeply than an upper section, particularly the uppermost 10% or 20% or 30%, of the low-beam light luminous surface of a headlight module or of the vehicle headlight. As a result, it is achieved that, without any large loss of installation space, the vehicle headlight can be integrated in an aerodynamically advantageously shaped headlight shell, in the case of which especially the cover plate is also steeper in the lower area than in the upper area.

Preferably the upper, particularly the right fraction of the low-beam light distribution provided for illuminating the own driving lane, which fraction is contributed to the total low-beam light distribution by the corresponding vehicle headlight or the corresponding headlight module, is essentially produced particularly at more than 50% or 60% or 70% or 80%, by a lower section, particularly the lowest 10% or 20% or 30%, of the low-beam light luminous surface of the first headlight module and/or of the second headlight module. This lower section of the low-beam light luminous surface may be as a rule situated more steeply and can therefore be imaged in a sharper fashion. Such a lower section is therefore particularly suitable for producing the upper, particularly the right fraction of the low-beam light distribution that is to be sharply defined and is provided for illuminating the own driving lane.

A headlight is particularly preferred in the case of which the ascending, particularly the asymmetrical part of the light/dark boundary of the low-beam light distribution, is essentially produced, in particular, at more than 50% or 60% or 70% or 80% by a lower section, particularly the lowest 10% or 20% or 30%, of the low-beam light luminous surface of the first headlight module and/or of the second headlight module. In this case, the "50% or 60% or 70% or 80%" again relate to the fraction of the low-beam light distribution that is contributed by the corresponding vehicle headlight or the corresponding headlight module to the total low-beam light distribution. A steeply situated surface can, as a rule, be imaged in a sharper fashion for producing a predefined low-beam light distribution. The imaging capability is therefore utilized of the steeply situated fraction of the lower section of the low-beam light luminous surface, whose imaging capability is relatively good for achieving a predefined low-beam light distribution.

As an alternative or in addition, the symmetrical part of the light/dark boundary of the low-beam light distribution, is essentially produced, in particular, at more than 50% or 60% or 70% or 80% or 90% by a lower section, particularly the lowest 10% or 20% or 30%, of the low-beam light luminous surface of the first headlight module and/or of the second headlight module. In this case, the "50% or 60% or 70% or 80%" again relate to the fraction of the low-beam light distribution that is contributed by the corresponding vehicle headlight or the corresponding headlight module to the total low-beam light distribution. A steeply situated surface can, as a rule, be imaged in a sharper fashion for producing a predefined low-beam light distribution. Here also, the relatively good imaging capability of the steeply situated fraction of the lower section of the low-beam light luminous surface is utilized.

As a result of different semiconductor emitters, particularly light-emitting diodes or groups of light-emitting diodes, in each case one light intensity distribution with an assigned concentration is preferably produced, in which case the semiconductor emitters and the pertaining optical elements particularly disposed in front are arranged and constructed such that the light intensity distribution produced by the lowest semiconductor emitter, particularly the lowest group of light-emitting diodes, has the highest concentration of these light intensity distributions.

Particularly preferably, it is provided that, as a result of different semiconductor emitters, particularly light-emitting diodes or groups of light-emitting diodes, in each case one light intensity distribution with an assigned concentrated is produced, in which case the semiconductor emitters and the pertaining optical elements, particularly disposed in front, are arranged and constructed such that, by the lowest semiconductor emitter or emitters, particularly by the lowest group of light-emitting diodes, of at least one headlight module, the light/dark boundary of the low-beam light distribution is produced.

Also within the scope of the invention is a vehicle headlight having devices, particularly the above-mentioned light sources and optical components, for generating a luminous surface which, when the headlight is switched to low-beam light, contributes to the producing of a low-beam light distribution, and which, when the headlight is switched to daytime driving light, contributes to the producing of a daytime driving light distribution, in which case the concentration of the light intensity distribution produced by the luminous surface, during or after the switching of the headlight to daytime driving light, is situated higher than during or after the switching of the headlight to low-beam light.

In this case, the luminous surface, in particular, is a part of preferably more than 50% or more than 70% or more than 90% of the total low-beam light luminous surface and/or daytime driving light luminous surface of the headlight or of a headlight module or the total low-beam light luminous surface and/or daytime driving light luminous surface of the headlight or of a headlight module.

This also creates a headlight at relatively low expenditures which has an at least similar appearance during the day and at night.

Other objects, advantages, and novel features of the present invention will become apparent from the following detailed description of one or more preferred embodiments when considered in conjunction with the accompanying drawings.

DETAILED DESCRIPTION OF THE DRAWINGS

Figure 1:
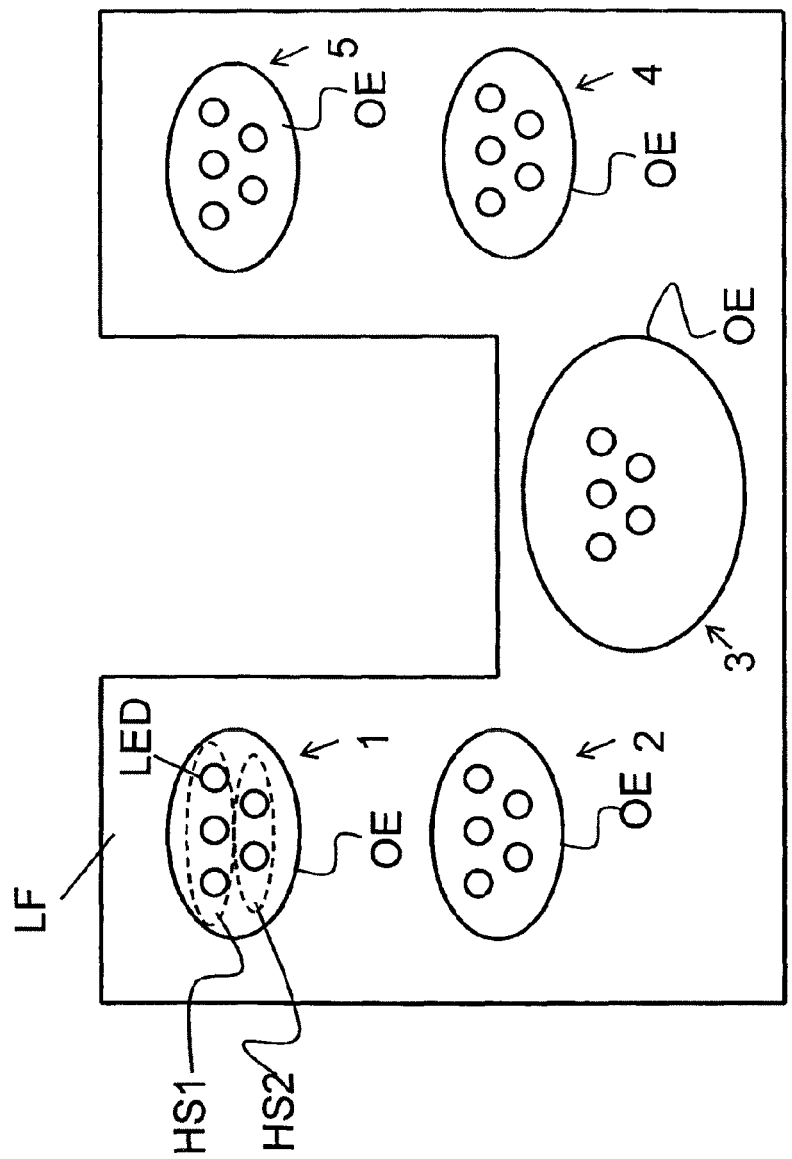
FIG. 1 is a schematic diagram of a front view of a headlight module.

The headlight module illustrated in FIG. 1 shows five groups 1, 2, 3, 4, 5 of five light-emitting diodes LEDs respectively. The five light-emitting diodes LEDs of each group are arranged in two semiconductor emitters HS1 and HS2 (only indicated for one group 1 as an example in the Figure), the first semiconductor emitter HS1 being placed higher than the second semiconductor emitter HS2. The semiconductor emitters HS1, HS2 may comprise one light-emitting diode LED or a group of light-emitting diodes LEDs.

In addition, at least one optical element disposed in front of the light-emitting diodes LEDs of the group is assigned to each group 1, 2, 3, 4, 5, which optical element may comprise, for example, one or more lenses, a Fresnel lens system, a diffusing lens and/or an intermediate light lens. The optical element assigned to a group 1, 2, 3, 4, 5 may be constructed in several parts and/or may be part of a larger optical element, such as a diffusing lens, which is assigned to and disposed in front of several groups 1, 2, 3, 4, 5. In this case, a diffusing lens disposed in front of several groups may also comprise an optical element, such as a Fresnel lens system that is disposed in front of a certain group. It is also conceivable that an optical element, such as a lens, is disposed in front of a group 1, 2, 3, 4, 5, and then a larger optical element, such as a diffusing lens, is disposed in front of this optical element, which larger optical element is also disposed in front of other groups 1, 2, 3, 4, 5.

As a result, by virtue of the groups 1, 2, 3, 4, 5 and the optical elements that are assigned or placed in front of them, a luminous surface LF is generated which can be perceived by an observer standing in front of the headlight and which, when a low-beam light distribution is produced, is called a low-beam light luminous surface, and when a day time driving light distribution is produced, is called a daytime driving light luminous surface, which, however, are both essentially identical within embodiments of the invention.

For producing the low-beam light distribution, the upper semiconductor emitter HS1, thus the upper three light-emitting diodes LEDs, of each group 1, 2, 3, 4, 5, are activated. The lower semiconductor emitters HS2 are deactivated.

For producing the daytime driving light distribution, the lower semiconductor emitter H2, thus the lower two light-emitting diodes LEDs, of each group 1, 2, 3, 4, 5 are activated. The upper semiconductor emitters HS1 are deactivated, partially activated or activated in a dimmed manner. In addition, a carrier device, which is not shown and which indirectly carries the light-emitting groups 1, 2, 3, 4, 5 together with assigned optical elements, can be swiveled such for producing the daytime driving light distribution such that the light distribution produced by the light-emitting groups 1, 2, 3, 4, 5, particularly the upper semiconductor emitters HS1, is moved upward.

Figure 2:
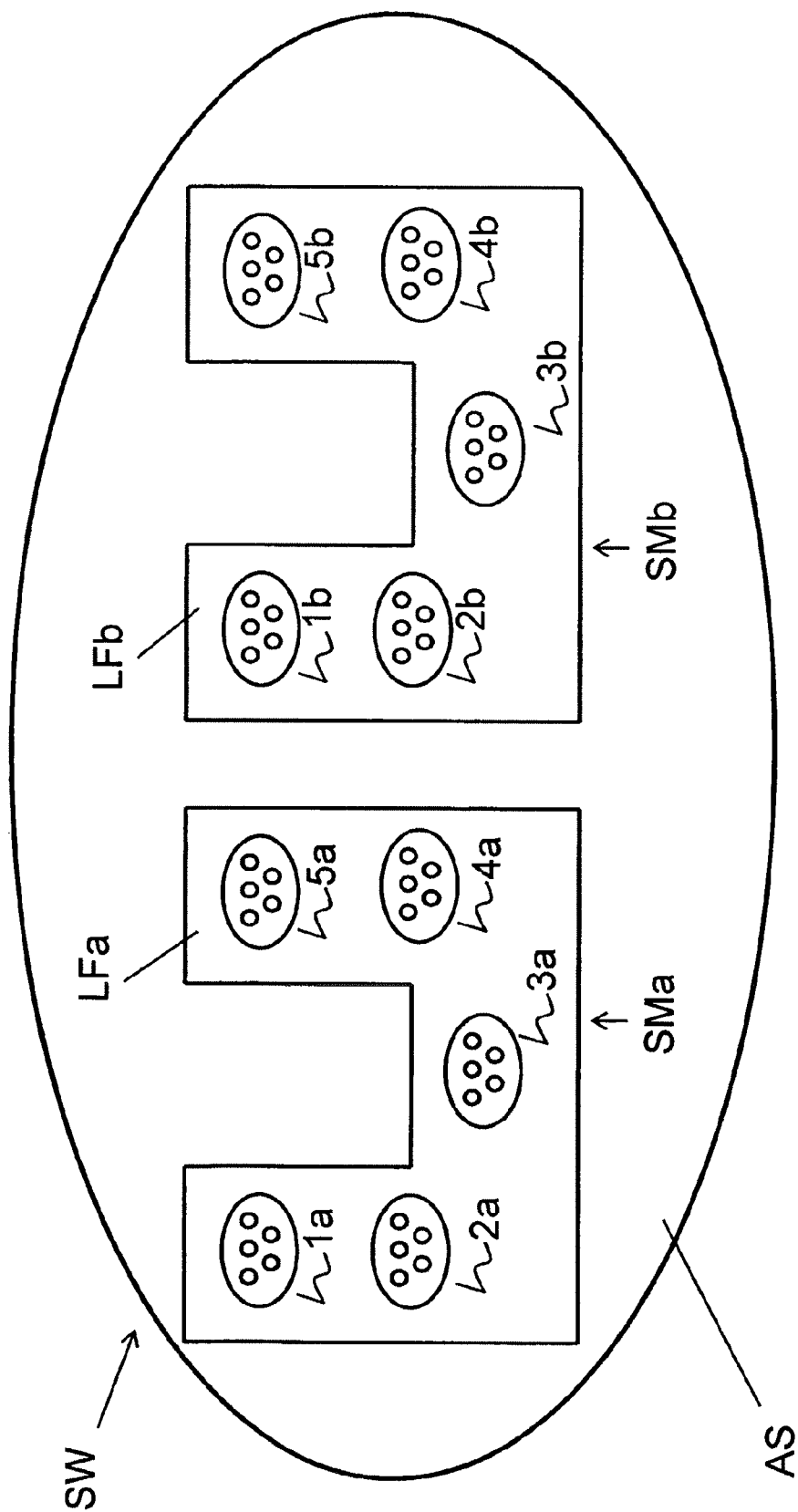
FIG. 2 is a schematic diagram of a front view of a vehicle headlight.

FIG. 2 illustrates a vehicle headlight SW that comprises two headlight modules SMa, SMb explained by FIG. 1, which are arranged behind a common cover plate AS. These each again comprise five light-emitting groups 1a, 2a, 3a, 4a, 5a and 1b, 2,b, 3b, 4b, 5b respectively. By each headlight module SMa and SMb respectively, one luminous surface LFa and LFb respectively is generated. When producing a low-beam light distribution and a daytime driving light distribution, these luminous surfaces LFa, LFb are in each case essentially identical. The two luminous surfaces LFa, LFb each contribute to the total low-beam light distribution and to the total daytime driving light distribution.

In addition to this vehicle headlight, a further corresponding vehicle headlight SW may be provided in order to produce a total low-beam light distribution and a total daytime driving light distribution.

Figure 3:
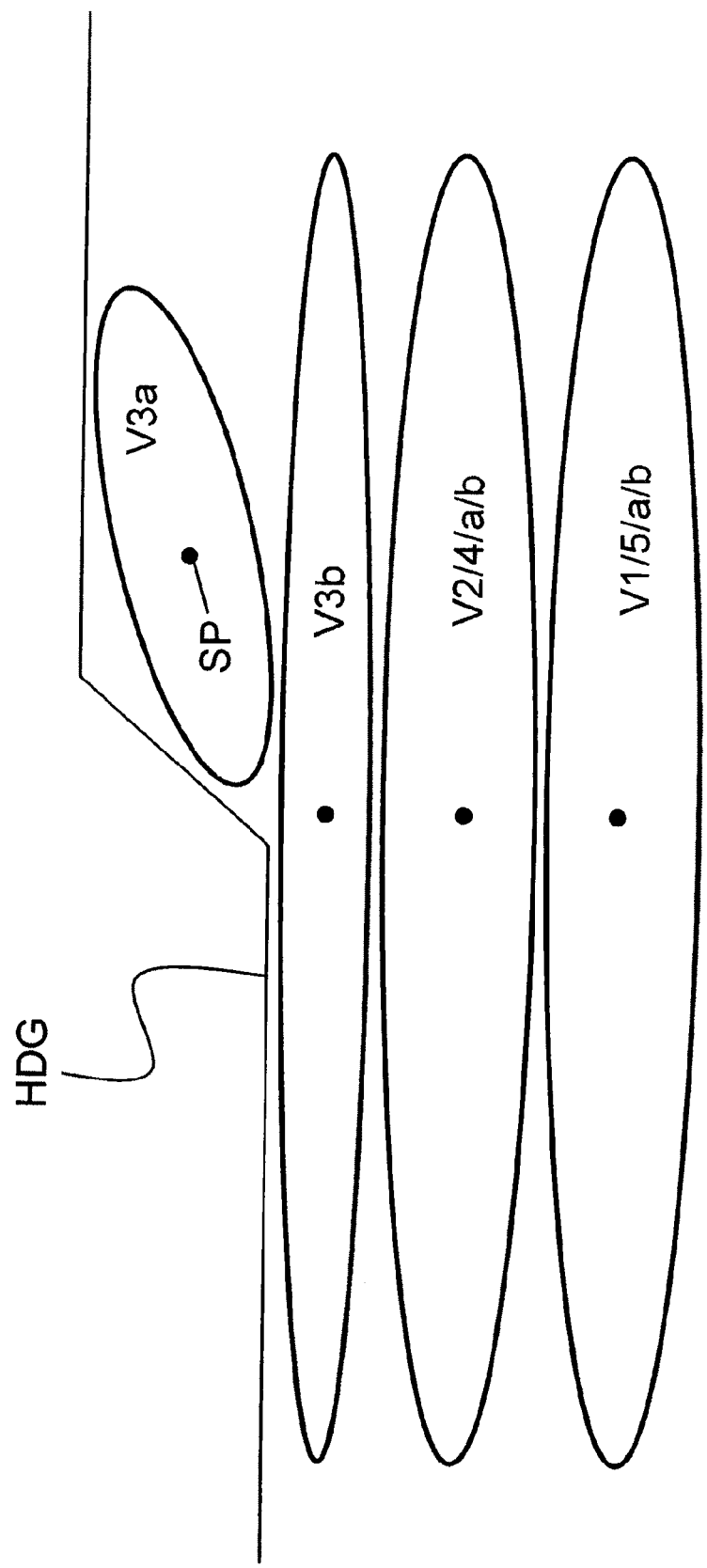
FIG. 3 is a diagram of a low-beam light distribution.

FIG. 3 illustrates a simplified representation of a low-beam light distribution with the typical light/dark boundary HDG broken down to its components V3a, V3b, V2/4/a/b, V1/5/a/b, each component having a light intensity concentration SP (in the figure, indicated as an example, only for a component V3a). In this case, component V3a of the low-beam light distribution is caused by the upper semiconductor emitter HS1 of light-emitting group 3a. In this case, component V3b of the low-beam light distribution is caused by the upper semiconductor emitter HS1 of light-emitting group 3b. Component V2/4/a/b of the low-beam light distribution is caused by the upper semiconductor emitter HS1 of light-emitting groups 2a, 2b, 4a, 4b. Component V1/5/a/b of the low-beam light distribution is caused by the upper semiconductor emitter HS1 of light-emitting groups 1a, 1b, 5a, 5b.

The above can also be viewed as follows: Component V3a of the low-beam light distribution is caused by the light-emitting group 3a or the corresponding luminous surface made luminous by the light-emitting group 3a. Component V3b of the low-beam light distribution is caused by the light-emitting group 3b or the corresponding luminous surface made luminous by the light-emitting group 3b. Component V2/4/a/b of the low-beam light distribution is caused by the light-emitting groups 2a, 2b, 4a, 4b or the corresponding luminous surfaces made luminous by the light-emitting groups 2a, 2b, 4a, 4b. Component V1/5/a/b of the low-beam light distribution is caused by the light-emitting groups 1a, 1b, 5a, 5b or the corresponding luminous surfaces made luminous by the light-emitting groups 1a, 1b, 5a, 5b.

In the case of a daytime driving light distribution, which is not shown, different luminous surfaces are generated by different light-emitting groups, which luminous surfaces again cause corresponding components of the daytime driving light distribution. In this case, the concentration of a light intensity distribution, which is produced by a certain luminous surface when the daytime driving light is switched on, is situated higher than the concentration of a light intensity distribution which is produced by a certain luminous surface when the low-beam light is switched on.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle headlight, comprising:
   a plurality of semiconductor emitters for alternatively producing a low-beam light distribution and a daytime driving light distribution, wherein:
   for producing the low-beam light distribution, a low-beam light luminous surface is generated by the vehicle headlight,
   for producing the daytime driving light distribution, a daytime driving light luminous surface is generated by the vehicle headlight,
   the low-beam light luminous surface and the daytime driving light luminous surface share at least a portion of a common luminous surface, such that the low-beam light luminous surface and the daytime driving light luminous surface are essentially identical, and
   the low-beam light luminous surface and the daytime driving light luminous surface are perceivable by an observer positioned in front of the vehicle headlight.

2. The vehicle headlight according to claim 1, wherein the semiconductor emitters are divided up onto a first headlight module and a second headlight module, each of which contributes to at least one of the low-beam light distribution or the daytime driving light distribution.

3. The vehicle headlight according to claim 2, wherein:
   the low-beam light distribution is perceptible as a low-beam light luminous surface of at least one of the first headlight module or the second headlight module, and
   the daytime driving light distribution is perceptible as a daytime driving light luminous surface of the first headlight module or the second headlight module.

4. The vehicle headlight according to claim 2, wherein the low-beam light luminous surface and the daytime driving light luminous surface of the first headlight module and the second headlight module are essentially identical with respect to their geometries.

5. The vehicle headlight according to claim 1, wherein a plurality of the semiconductor devices are jointly utilized for producing the low-beam light distribution and the daytime driving light distribution, or identical ones of the semiconductor emitters are used for producing the low-beam light distribution and the daytime driving light distribution.

6. The vehicle headlight according to claim 1, wherein a ratio of a surface circumference to a surface content is higher for at least one of the low-beam light luminous surface or the daytime driving light luminous surface than a rectangle circumscribing the at least one of the low-beam light luminous surface or the daytime driving light luminous surface.

7. The vehicle headlight according to claim 2, wherein the semiconductor emitters and a plurality of optical elements disposed in front of the semiconductor elements are constructed and arranged relative to one another such that a brightness of at least one of the low-beam light luminous surface or the daytime driving luminous surface is perceptible as essentially homogeneous.

8. The vehicle headlight according to claim 7, further comprising:
   a carrier device for carrying at least one of the semiconductor emitters or the optical elements of at least one of the first headlight module or the second headlight module;
   a swiveling device for swiveling the carrier device such that the light distribution produced by at least one of the first headlight module or the second headlight module is moved vertically; and
   a control device for controlling the swiveling device such that, for producing the daytime driving light distribution, at least a part of the low-beam light distribution is swiveled upward and at least partly utilized.

9. The vehicle headlight according to claim 1, further comprising:
   at least one low-beam light semiconductor emitter for producing at least the low-beam light distribution; and
   at least one daytime driving light semiconductor emitter for producing the daytime driving light distribution,
   wherein the low-beam light semiconductor emitter, the daytime driving light semiconductor emitter, and at least one optical element assigned to and disposed in front of at least one of the low-beam light semiconductor emitter or the daytime driving light semiconductor emitter are constructed and arranged relative to one another such that light originating from the low-beam light semiconductor emitter and light originating from the daytime driving light semiconductor emitter is imaged by the optical element.

10. The vehicle headlight according to claim 1, further comprising:
    at least one low-beam light semiconductor emitter for producing at least the low-beam light distribution, and
    at least one daytime driving light semiconductor emitter for producing the daytime driving light distribution, wherein:
    at least one lens is disposed in front of at least one of the low-beam light semiconductor emitter or the daytime driving light semiconductor emitter, such that light originating from the low-beam light semiconductor emitter and light originating from the daytime driving light semiconductor emitter is imaged by the lens, and
    the daytime driving light semiconductor emitter is arranged lower than the low-beam light semiconductor emitter.

11. The vehicle headlight according to claim 1, further comprising:
    at least one low-beam light semiconductor emitter for producing at least the low-beam light distribution; and
    at least one daytime driving light semiconductor emitter for producing the daytime driving light distribution, wherein:
    at least one lens is disposed in front of at least one of the low-beam light semiconductor emitter or the daytime driving light semiconductor emitter such that light originating from the low-beam light semiconductor emitter and light originating from the daytime driving light semiconductor emitter is imaged by the lens, at least one of the light originating from the daytime driving light semiconductor emitter or the light originating from the low-beam light semiconductor emitter is guided by at least one optical waveguide to a corresponding daytime driving light output point or low-beam light output point, and at least one of the daytime driving light semiconductor emitter or the daytime driving light output point is arranged lower than at least one of the low-beam light semiconductor emitter or the low-beam light output point.

12. The vehicle headlight according to claim 2, wherein the first module is swivelable in a horizontal direction.

13. The vehicle headlight according to claim 1, wherein a lower section of a luminous surface of at least one of the first headlight module or the second headlight module is situated more steeply than an upper section of the luminous surface.

14. The vehicle headlight according to claim 2, wherein an upper right fraction of the low-beam light distribution provided for illuminating an own driving lane is produced at more than 50% by a lower section of a luminous surface of at least one of the first headlight module or the second headlight module.

15. The vehicle headlight according to claim 2, wherein an ascending asymmetrical part of a light/dark boundary of the low-beam light distribution is produced at more than 50% by a lower section of a luminous surface of at least one of the first headlight module or the second headlight module.

16. The vehicle headlight according to claim 2, wherein a symmetrical part of a light/dark boundary of the low-beam light distribution is produced at more than 50% by a lower section of a luminous surface of at least one of the first headlight module or the second headlight module.

17. The vehicle headlight according to claim 7, wherein the semiconductor emitters and the optical elements disposed in front of the semiconductor emitters are arranged and constructed such that a light intensity distribution produced by a lowest semiconductor emitter or lowest semiconductor emitters has a highest concentration.

18. The vehicle headlight according to claim 7, wherein the semiconductor emitters and the optical elements disposed in front of the semiconductor elements are arranged and constructed such that a light/dark boundary of the low-beam light distribution is produced at least in sections by a lowest semiconductor emitter or lowest semiconductor emitters.

19. The vehicle headlight according to claim 1, wherein the semiconductor emitters comprise light-emitting diodes or groups of light-emitting diodes.

20. The vehicle headlight according to claim 1, wherein the common luminous surface comprises a lens.

* * * * *